United States Patent [19]
Grubb

[11] 3,856,636
[45] Dec. 24, 1974

[54] OXYGEN SENSOR
[75] Inventor: Willard T. Grubb, Schenectady, N.Y.
[73] Assignee: General Electric Company, Schenectady, N.Y.
[22] Filed: Nov. 30, 1972
[21] Appl. No.: 310,772

[52] U.S. Cl. .......................... 204/195 P, 204/195 R
[51] Int. Cl. ........................................... G01n 27/46
[58] Field of Search .............. 204/1 T, 195 R, 195 P

[56] References Cited
UNITED STATES PATENTS

| | | | |
|---|---|---|---|
| 2,278,248 | 3/1942 | Darrah | 204/195 R |
| 2,913,386 | 11/1959 | Clark | 204/195 P |
| 3,415,730 | 12/1968 | Haddad | 204/195 P |
| 3,493,484 | 2/1970 | Berg et al. | 204/195 R |
| 3,719,576 | 3/1973 | Macur | 204/195 P |

Primary Examiner—T. Tung
Attorney, Agent, or Firm—Paul R. Webb, II; Joseph T. Cohen; Jerome C. Squillaro

[57] ABSTRACT

An oxygen sensor is described which includes a first electrode of a noble metal, a second electrode of silver with at least a partial layer of silver halide thereon, and an aqueous buffered electrolyte solution containing a halide salt and an oxidizable fuel contacting at least a portion of the electrodes.

3 Claims, 1 Drawing Figure

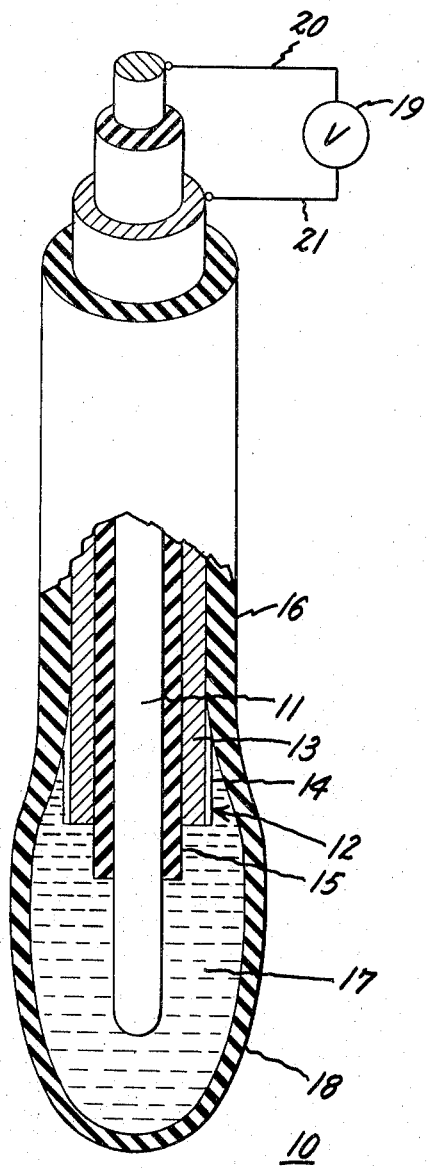

OXYGEN SENSOR

Reference is made to copending patent application entitled "Sensor and Method of Manufacture" filed Sept. 4, 1970, and given Ser. No. 69,650, now U.S. Pat. No. 3,714,015, which describes and claims a sensor including an ion exchange resin electrolyte and methods of manufacture. This copending application, in the name of Leonard W. Niedrach, is assigned to the same assignee as the present application.

The present invention relates to oxygen sensors and, more particularly, to oxygen sensors employing a noble metal electrode and an aqueous buffered solution of an electrolyte containing a halide salt and an oxidizable fuel.

Oxygen sensors are known in the prior art for determining oxygen content of a sample. Such a sensor has a pair of electrodes that are connected by means of an electrolyte medium. The electric circuit parameters of this device change when exposed to materials having different oxygen content as for example, oxygen from blood when passing into the sensor electrolyte changes the voltage between the two electrodes and the change increases with increasing oxygen content of the sample. A membrane is positioned over the cathode to maintain the electrolyte in position. Such a membrane is selectively permeable so that it passes substances of interest while blocking other substances that might interfere with or be detrimental to the measuring operations.

The primary objects of my invention are to provide a rugged and dependable oxygen sensor, which is suitable for biomedical, environmental control, and other applications.

In accordance with one aspect of my invention, an oxygen sensor comprises a first electrode of a noble metal, a second electrode spaced from the first electrode, the second electrode comprising silver with at least a partial layer of silver halide thereon, and an aqueous buffered solution of an electrolyte containing a halide salt and an oxidizable fuel contacting at least a portion of both electrodes.

These and various other objects, features and advantages of the invention will be better understood from the following description taken in connection with the accompanying drawing in which:

The single FIGURE is a partial sectional view of a portion of an oxygen sensor made in accordance with my invention.

In the single FIGURE of the drawing, there is shown generally at 10 a portion of an oxygen sensor embodying my invention. Sensor 10 is shown with a first electrode 11 of a noble metal, such as platinum in the form of a thin wire. A second electrode 12 is shown comprising a silver tube 13 with a layer of silver halide 14 on its lower portion. A first layer of electrical insulation 15 is disposed between first electrode 11 and second electrode 12 in the form of a tube, coating, etc. A second layer of electrical insulation 16 is disposed over second electrode 12. An aqueous buffered solution of an electrolyte containing a halide salt and oxidizable fuel contacts a portion of first electrode 11, and the silver halide surface 14 of the second electrode 12. An outer sheath 18 of oxygen permeable, ion-impermeable diffusion barrier material encapsulates at least the aqueous solution and the portions of first electrode 11, and the silver halide layer 14 of electrode 12 in contact with aqueous solution 18. A high impedance voltmeter 19 is shown connected to electrode 11 by means of a lead 20 and connected to silver tube 13 by an electrical lead 21.

I found that I could form the above improved oxygen sensors by a method of applying successive elements from various solutions after which each solution solvent was evaporated. The application of the successive layers is preferably accomplished by immersion steps but other suitable means include coating, spraying, brushing, etc. The use of immersion steps are described and claimed in the above referenced patent application Ser. No. 65,650.

The oxygen sensor of my invention can be formed by employing for the initial support wire which forms the first electrode, a noble metal such as platinum. The other noble metals can also be employed. The portion of the noble metal wire to be in contact with aqueous solution is cleaned, for example, by grit blasting.

Various electrical insulating materials are useable and can be applied by coating steps. Preferred materials include hexafluoropropylene-vinylidene fluoride rubber, polyester resin lacquer, silicone rubbers, polyolefins, epoxy resins, etc. I prefer to employ a polyester resin lacquer which provides the desired electrical insulation and which can be applied by coating or dipping. The polyester resin lacquer can be cross-linked by heating to insolubility and therefore facilitates the application of successive layers. Various oxygen diffusion barrier materials are suitable as an outer sheath to encapsulate the aqueous solution and the portions of the first electrode and the silver halide layer of the second electrode in contact with the aqueous solution. The oxygen permeable ion-impermeable diffusion barrier material must have high resistivity and have an appropriate permeability coefficient for the oxygen to be sensed. Since these materials have high electrical resistivities the oxygen diffusion barrier sheath and the second layer of insulation can be made with one of these materials. Thus, the second support layer of electrical insulation can be eliminated as a separate item. Suitable materials include silicone-polycarbonate copolymers, hexafluoropropylene-vinylidene fluoride rubber and silicone rubbers.

The second electrode is a silver-silver halide electrode. This electrode can be formed by depositing a silver chloride layer on a silver base such as a silver tube. Other silver halides except fluorides are useful.

The aqueous solution can be made from a broad range of aqueous buffered electrolytes containing a halide salt and oxidizable fuels. Such suitable electrolytes include a buffered aqueous solution of a halide salt corresponding to the silver halide, for example, potassium chloride or sodium chloride, or a saturated solution of the silver halide itself. The buffer which is in the vicinity of pH 5.0 is, for example, a borate or a phosphate buffer. A gelling agent can also be incorporated into the aqueous electrolyte providing a gelled solution which can be applied readily to the electrodes. For example, suitable gelled aqueous electrolytes include an aqueous solution of a soluble halide salt corresponding to the halide in the silver halide layer, a buffering couple such as borate or phosphate preferably in the vicinity of pH 5.0, and a gelling agent. Such gelling agents include agar, methyl cellulose, ethyl cellulose, guar gums, polyacrylates, polyethers, polyamides, etc.

Suitable oxidizable fuel includes alcohols, ethylene glycol, glycerol, various other polyhydric alcohols, polymers containing COH groups, etc. Various weight percentage of the fuel to electrolyte can be employed. For example, 0.1 to 50.0% can be used. Within this range, 0.5 to 5.0% is preferred.

I found that I could chemically bias the noble metal electrode to provide an oxygen sensor. It is believed that the oxidizable fuel oxidizes electrochemically to bias the noble metal or that a mixed potential is involved due to the competitive adsorption of fuel and oxygen. However, I do not wish to be bound by either of these theoretical explanations of my invention.

Examples of electrode structures and oxygen sensors made in accordance with my invention are as follows:

EXAMPLE I

An electrode structure was made by employing a 0.030 inch platinum wire which was suitably insulated with heat shrinkable polyethylene tubing. A one half inch of the wire was left exposed at one end. The exposed end of the wire was then grit blasted to clean and roughen the surface.

A solution was prepared by employing 100 mg. of ethylene glycol, water, and pH 5.0 phosphate buffer to provide a volume of 10 ml. In this manner, the ethylene glycol was present in an amount of one weight percent. Single strength p Hydrion pH 5.0 phosphate buffer was employed. This buffer is manufactured by Micro Essential Laboratory, Brooklyn, New York.

The exposed end of the wire was positioned in the above solution. The voltage was measured against an Ag/AgCl 3N KCl salt bridge reference electrode in the same solution. The resulting structure was an oxygen sensor.

EXAMPLE II

The oxygen sensor of Example I was tested with a voltage-time recorder. 21% oxygen and 100% oxygen were bubbled alternately into the aqueous solution. The voltage response of the platinum wire was very high, approximately 110 millivolts in a shift from 21% oxygen to 100% oxygen. The 90% time constants were estimated from the recorder trace to be about 2 to 3 minutes in either direction.

EXAMPLE III

An electrode structure was made by employing a 0.030 inch platinum wire which was suitably insulated with heat shrinkable polyethylene tubing. A one half inch of the wire was left exposed at one end. The exposed end of the wire was then grit blasted to clean and roughen the surface.

A solution was prepared by employing 67 mg. of ethylene glycol, water, and pH 5.0 phosphate buffer to provide a volume of 10 ml. In this manner, the ethylene glycol was present in an amount of 0.67 weight percent. Single strength p Hydrion pH 5.0 phosphate buffer was employed. This buffer is manufactured by Micro Essential Laboratory, Brooklyn, New York.

The exposed end of the wire was positioned in the above solution. The voltage was measured against an Ag/AgCl 3N KCl salt bridge reference electrode in the same solution. The resulting structure was an oxygen sensor.

EXAMPLE IV

The oxygen sensor of Example III was tested with a voltage-time recorder. 21% oxygen and 100% oxygen were bubbled alternately into the aqueous solution. The voltage response of the platinum wire was very high, approximately 110 millivolts in a shift from 21% oxygen to 100% oxygen. The 90% time constants were estimated from the recorder trace to be about 2 to 3 minutes in either direction.

EXAMPLE V

The oxygen sensor of Example I was also evaluated by the absolute values of voltage on air (21% oxygen) and oxygen (100% oxygen) and their difference as a function of time. This evaluation is shown for a 60 hour period below in Table I.

TABLE I

| Elapsed Time- Hours | E. Oxygen- mv. | E. Air- mv. | Difference · mv. |
|---|---|---|---|
| 0 | 407 | 312 | 95 |
| 0 | 414 | 320 | 96 |
| 6 | 421 | 319 | 102 |
| 12 | 421 | 321 | 100 |
| 18 | 420 | 319 | 101 |
| 24 | 427 | 321 | 106 |
| 30 | 433 | 322 | 111 |
| 36 | 434 | 322 | 112 |
| 42 | 432 | 321 | 111 |
| 48 | 434 | 321 | 113 |
| 60 | 432 | 321 | 111 |

While other modifications of the invention and variations thereof which may be employed within the scope of the invention have not been described, the invention is intended to include such as may be embraced within the following claims:

What I claim as new and desire to secure by Letter Patent of the United States is:

1. A chemically biased oxygen sensor comprising of a first electrode of platinum, an electrical lead connected to the first electrode, a second electrode spaced from the first electrode, a second electrode comprising silver with at least a partial layer of silver halide thereon, an electrical lead connected to the second electrode, an aqueous pH 5 buffered electrolyte solution containing a halide salt and 0.5 to 5.0 weight percent of an oxidizable fuel selected from the class consisting of alcohols, ethylene glycol, glycerol, and polymers containing COH groups contacting at least a portion of both electrodes, and a high impedance voltmeter connected to the opposite ends of the electrical leads.

2. A chemically biased oxygen sensor comprising of a first electrode of platinum, an electrical lead connected to the first electrode, a second electrode surrounding at least a portion of the first electrode, the second electrode comprising silver with at least a partial layer of silver halide thereon, an electrical lead connected to the second electrode, a first layer of electrical insulation deposited between the first and the second electrodes, a second layer of electrical insulation deposited over the second electrode, an aqueous pH 5 buffered electrolyte solution containing a halide salt and 0.5 to 5.0 weight percent of a oxidizable fuel selected from the class consisting of alcohols, ethylene glycol, glycerol, and polymers containing COH groups contacting at least a portion of the first electrode and the silver halide layer of the second electrode, an outer sheath of oxygen permeable, ion-impermeable diffusion barrier material encapsulating at least the aqueous buffered solution, at least a portion of the first electrode, and the silver halide layer of the second electrode in contact with the aqueous solution and a high impedance voltmeter connected to the opposite ends of the electrical leads.

3. An oxygen sensor as in claim 2, in which the first electrode is a platinum wire, the second electrode is silver with a partial layer of silver chloride thereon, the aqueous solution contains potassium chloride, 0.67 weight percent ethylene glycol, and a pH 5.0 phosphate buffer, the first insulation is of polyester resin lacquer, and the second insulation and the diffusion barrier are of silicone polycarbonate copolymer.

* * * * *